United States Patent Office 2,755,389
Patented July 17, 1956

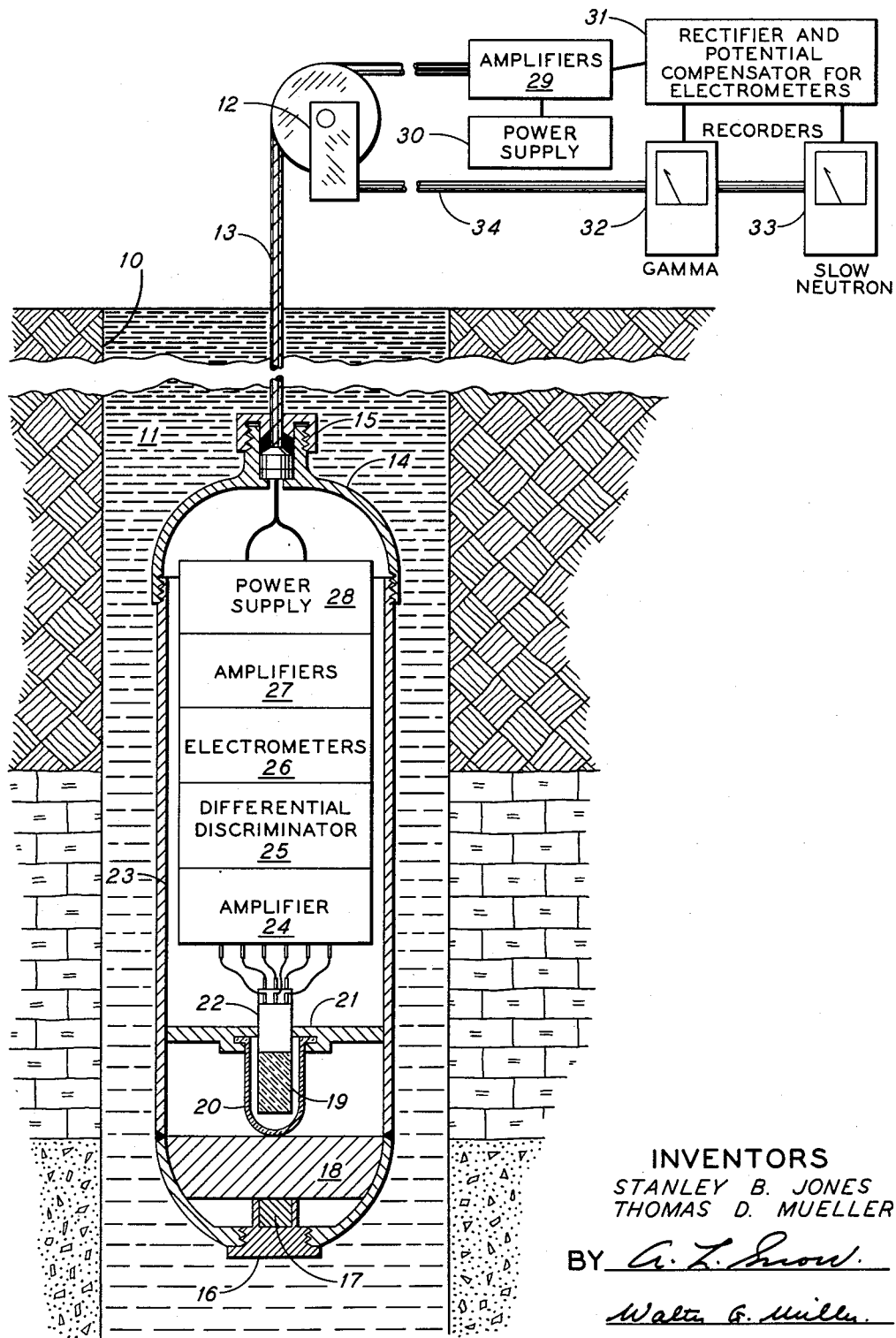

2,755,389

THERMAL NEUTRON AND GAMMA RADIATION WELL LOGGING

Stanley B. Jones, Whittier, and Thomas D. Mueller, La Habra, Calif., assignors to California Research Corporation, San Francisco, Calif., a corporation of Delaware Application February 1, 1952, Serial No. 269,538

1 Claim. (Cl. 250—71)

This invention relates to well logging by the simultaneous measurement of thermal neutron and gamma radiations from subsurface formations which have been irradiated by an intense source of fast neutron, and particularly refers to an improved apparatus by means of which the solid and liquid constituents of the formation may be identified.

Heretofore, simultaneous indications of thermal neutrons and gamma radiations from previously irradiated formations have been detected by ionization chambers or Geiger counters, which are relatively inefficient and gave only indifferent or indistinct indications of elements present in the surface formations penetrated by the well and, furthermore, do not provide strong and easily distinguishable signals for both neutrons and gamma rays of various energies.

This invention involves broadly an improved combination of apparatus for detecting the above-named secondary radiations, utilizing as a phosphor a lithium iodide crystal having about 1 percent of thallium iodide as an impurity. The lithium iodide crystal (thallium activated) not only produces a light pulse from a gamma ray proportional in intensity to the energy dissipated in the crystal by the gamma ray but also provides a light pulse of one particular intensity when a thermal neutron enters the crystal and is absorbed by a lithium nucleus. Lithium isotope six has a high affinity for thermal neutrons and the reaction energy is unique. For this reason uniform light pulses are produced in the crystal by slow neutrons. If desired, lithium enriched in isotope six may be used in manufacturing the crystal. Consequently, if the light pulses are sorted out according to intensity in some fashion when the crystal is exposed to a flux of thermal neutrons and gamma radiation, both the flux density of thermal neutrons and the energy spectrum of the gamma radiation can be inferred. This sorting-out procedure is done by combing the lithium iodide (thallium activated) phosphor in a scintillation counter in which the light photons produced are impressed upon a photomultiplier tube. The corresponding and proportional electrical pulses from the photomultiplier tube are amplified and subsequently discriminated to distinguish the relative intensity of pulses or signals due to the slow neutrons and the gamma quanta emanating from the formation to which the phosphor is exposed. Now the density of slow neutron flux and the intensity and shape of the gamma ray energy spectrum provide a quantitative measure of the relative amounts of the various elements present in the well formations, whether they are present in solids, gases or liquids. Consequently, the procedure and apparatus described herein enables the user to correlate various formations from well to well and also to identify the composition of the formation constituents and fluids which may be present therein.

It is an object of this invention to provide an improved and more sensitive apparatus for simultaneous induced gamma and thermal neutron detection in well logging than those heretofore disclosed.

Another object is to provide a well logging apparatus that will discriminate the numbers of pulses of various magnitudes produced by a scintillation counter, whereby the elemental origin of the gamma radiation may be identified and the total fluid content of the formations inferred from the density of slow neutron flux.

These and other objects and advantages will be apparent from the following description and from the attached drawing which forms a part of this specification and illustrates a preferred embodiment of the invention.

The drawing is a diagrammatic illustration, partly in section, of apparatus utilizing the process of this invention. Reference numeral 10 designates generally a well bore which is filled with drilling fluid 11. Support means generally designated 12 are adapted to receive a multiconductor cable 13, at the lower end of which a casing 14 is attached by means of a stuffing box 15. At the lower end of casing 14 is a removable plug 16 adapted to carry a source 17 of fast neutrons, which source may be a mixture of polonium and beryllium. A shield 18 of lead or suitable heavy metal and of boron or other neutron absorber extends across the lower end of casing 14 above the radioactive source 17 to reduce the effect of said source upon the detector unit, which will be described below.

In this example, the detector unit comprises a crystal 19 of lithium iodide having about 1 percent of thallium iodide as an impurity. Desirably, this should be about a one-inch cube mounted in a quartz or other suitable jacket 20 adapted to be evacuated or at least sealed with an inert dry gas or liquid, due to the extreme deliquescence of the crystal material. The jacket 20 may be suitably supported in a diaphragm 21, into which the end of a Radio Corporation of America No. 5819 photomultiplier tube 22 may be sealed. Within chamber 23, which is formed in casing 14 by diaphragm 21, the necessary electronic equipment is contained. This converts the light photons, produced in crystal 19 by slow neutrons and gamma quanta from the formations surrounding well bore 10, into electrical impulses of suitable frequency and amplitude to be transmitted through cable 13 to the recording mechanism at the surface of the ground.

A preferred arrangement of the electronic equipment comprises a linear amplifier 24, whose output passes through a differential discriminator 25 and thence to the first sections of a plurality of vibrating reed electrometers 26, each of which is tuned to a separate frequency for transmitting the signal of a particular discriminator channel. One of the channels is used for thermal neutron pulses and the others are used for the gamma ray energy spectrum. The alternating current outputs of the electrometers pass into corresponding alternating current amplifiers 27 and are then transmitted to the surface through the multi-conductor insulated cable 13. Power supply means generally designated 28 is placed in chamber 23 to give a suitable local electric power source for the electronic equipment just described.

The indicating and recording apparatus connected to the upper end of cable 13 at the surface of the ground desirably consists of additional alternating current linear amplifiers 29 supplied from a suitable electric power source 30 and adapted to convey their respective outputs into motor driven potential compensating means 31, in which the impulses are rectified, after which they are separately transmitted to a group of recorders such as 32 and 33, so that the latter are responsive, respectively, to gamma radiations and to slow neutrons from the formations surrounding well bore 10. Recorder 32 may be a multiple pen unit for separately recording the signals of all of the electrometers used for the gamma ray energy spectrum. Desirably, a synchronizing means generally designated 34 connects the cable support means 12 with the recorders 32 and 33 to correlate the indications of the latter with the length of the cable 13 which is suspended within well bore 10. This correlates these indications with the depth of the formations from which the secondary radiations are received.

Utilizing the foregoing equipment and procedure, one skilled in the art is able to determine the constituents of the formation being logged at the same time that they are being bombarded by the fast neutron flux from source 17. The pulse height differential discriminator is of particular value in this regard in separating the slow or thermal neutron-induced pulses from those induced by gamma quanta. Desirably, but not necessarily, the energy spectrum of several magnitudes of the gamma rays can be presented and analyzed separately using procedures and apparatus which are well known in this art.

In conclusion, it will be appreciated that this invention comprehends broadly an improved apparatus for nuclear well logging and particularly for the simultaneous logging of slow or thermal neutrons and gamma radiation at an efficiency which has not heretofore been realized. This is due primarily to the high photon-producing efficiency of the lithium iodide (thallium activated) crystal. Lithium isotope six has a very large cross-section (about 900 barns) for thermal neutrons. An important feature of the method is that the uniformity of the pulse response of this crystal to slow neutrons and the relatively large size of the pulses permits their discrimination by the differential discriminator from the gamma-produced pulses. If desired, the discriminator and vibrating reed electrometers may be replaced by a conventional oscilloscope and camera and the final record made upon photographic film. The various heights of pulses photographed would be interpreted in the same way as would the magnitude and distribution of comparable pulses analyzed by the discriminator. In the detailed description above, the vibrating reed electrometer forms a convenient conversion and transmission agent to carry alternating current pulses to the surface for amplification and rectification rather than utilizing the direct current output of the differential discriminator.

While various modifications and changes have been suggested above, it is obvious that others will occur to those skilled in the art, so that all of those which fall within the scope of the appended claim are intended to be embraced thereby.

We claim:

A device for geophysical prospecting of earth formations traversed by a well bore comprising a casing adapted to be traversed throughout said well bore, a source of fast neutrons associated with said casing, a single phosphor crystal responsive to both gamma rays and thermal neutrons in said casing, shielding means between said phosphor crystal and said neutron source for preventing gamma rays and thermal neutrons from being transmitted directly between said crystal and source, a photomultiplier tube responsive to the total number of light photons produced in said crystal by both thermal neutrons and gamma rays randomly detected in said crystal, a linear amplifier connected to the output of said photomultiplier tube for developing an electrical pulse for each nuclear event detected in said crystal, each of said electrical pulses having an amplitude corresponding to the total number of light photons produced in said crystal by said event, a differential discriminator connected to said amplifier for separating individual electrical pulses due to thermal neutrons from the individual electrical pulses due to gamma rays, a plurality of vibrating reed electrometers connected to the output of said differential discriminator, at least one of said electrometers being responsive to the output channel of said discriminator measuring electrical pulses due to thermal neutrons, and the remainder of said electrometers being responsive to selectable pulse amplitudes representative of gamma rays having particular energies, and means for separately recording said pulses due to the thermal neutrons and said pulses resulting from gamma rays in accordance with the depth of said casing in said well bore.

References Cited in the file of this patent

UNITED STATES PATENTS

| | | |
|---|---|---|
| 2,481,964 | Wollan | Sept. 13, 1949 |
| 2,504,888 | Siegert et al. | Apr. 18, 1950 |
| 2,584,138 | Lichtman | Feb. 5, 1952 |
| 2,644,891 | Herzog | July 7, 1953 |
| 2,648,012 | Scherbatskoy | Aug. 4, 1953 |
| 2,659,011 | Youmans et al. | Nov. 10, 1953 |

OTHER REFERENCES

"A Scintillation Counter for Thermal Neutrons," by James E. Draper, from Review of Scientific Instruments, vol. 22, No. 7, July 1951, page 543.